US011639751B2

(12) United States Patent
Barnes et al.

(10) Patent No.: US 11,639,751 B2
(45) Date of Patent: *May 2, 2023

(54) DIAMETER SAVING RING GEAR FLEXURE

(71) Applicant: Textron Innovations Inc., Fort Worth, TX (US)

(72) Inventors: Aaran Ashley Barnes, Fort Worth, TX (US); Eric S. Olson, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,550

(22) Filed: Oct. 11, 2021

(65) Prior Publication Data
US 2022/0099172 A1    Mar. 31, 2022

Related U.S. Application Data

(63) Continuation of application No. 17/034,411, filed on Sep. 28, 2020, now Pat. No. 11,187,315.

(51) Int. Cl.
*F16H 1/28* (2006.01)
*F16H 57/023* (2012.01)
*F16H 57/08* (2006.01)
*F16H 48/38* (2012.01)

(52) U.S. Cl.
CPC ......... *F16H 57/023* (2013.01); *F16H 57/082* (2013.01); *F16H 2048/385* (2013.01)

(58) Field of Classification Search
CPC ............... F16H 57/023; F16H 57/082; F16H 2048/385; F16H 1/2818; F16H 57/08; F16H 2055/176
See application file for complete search history.

(56) References Cited

U.S. PATENT DOCUMENTS 10,495,206 B2 * 12/2019 Zhu .................... F16H 57/08
11,187,315 B1 * 11/2021 Barnes ............... F16H 1/2818

FOREIGN PATENT DOCUMENTS

FR    3082891 A1 * 12/2019
GB     789182 A  *  1/1958

* cited by examiner

*Primary Examiner* — Sherry L Estremsky
(74) *Attorney, Agent, or Firm* — Akona IP

(57) ABSTRACT

A ring gear assembly includes a ring gear, a gear box case, and a set of bolts. The ring gear includes a set of gear teeth inside the ring gear and arranged in a circle around the ring gear axis. The ring gear further includes a set of flanges arranged along at least one side of the ring gear. Each flange has a respective flange bolt hole therethrough, and each flange bolt hole has a respective bolt axis that is oriented perpendicular to the ring gear axis. The gear box case has a set of gear box bolt holes therethrough, each gear box bolt hole corresponding to a respective one of the flange bolt holes. Each of the bolts passes through a respective one of the gear box bolt holes and its corresponding flange bolt hole to fasten the ring gear to the gear box case.

20 Claims, 8 Drawing Sheets

DIAMETER SAVING RING GEAR FLEXURE

CROSS-REFERENCE TO RELATED APPLICATION

This application is a continuation and claims the benefit of priority under 35 U.S.C. § 120 of U.S. application Ser. No. 17/034,411 filed on Sep. 28, 2020, entitled "DIAMETER SAVING RING GEAR FLEXURE," Inventors: Aaran Ashley Barnes, et al. The disclosure of the prior application is considered part of and is incorporated in its entirety by reference in the disclosure of this application.

TECHNICAL FIELD

This disclosure relates in general to the field of ring gears and, more particularly, to a low-profile flexible connection between a ring gear and a gear box.

BACKGROUND

Transmission systems based on planetary gear systems are used to transfer power in many transportation and industrial applications. For example, aircraft systems use planetary gear systems to transfer power to the main rotors and tail rotors. A planetary gear system includes a central gear (sun gear) surrounded by a set of gears (planet gears) that rotate within a larger outer gear, referred to as a ring gear.

The ring gear is connected to a gear box case that houses the transmission system. Connections between ring gears and gear box cases are often designed to allow some movement of the ring gear within the case during operation. However, current designs for flexible connections around transmission systems typically take up valuable real estate within larger systems and put spacing pressure on other components. For example, in some current transmission designs for aircraft systems, the ring gear has an extended cantilevered portion that bolts into a corresponding portion of the gear box case, with the bolts extending in the same direction as the ring gear teeth. The cantilevered connection increases the overall diameter of the transmission system, which produces space constraints on surrounding components in an aircraft system, such as the airframe, hydraulics, and controls.

SUMMARY

One embodiment is a ring gear assembly that includes a ring gear, a gear box case, and a plurality of bolts. The ring gear includes a plurality of gear teeth in an inside of the ring gear; the gear teeth are arranged in a circle around a ring gear axis. The ring gear also includes a plurality of flanges arranged along at least one side of the ring gear, each flange having a respective flange bolt hole therethrough, and each flange bolt hole having a respective bolt axis that is perpendicular to the ring gear axis. The gear box case includes a plurality of gear box bolt holes therethrough, each of the gear box bolt holes corresponding to a respective one of the flange bolt holes. Each of the plurality of bolts passes through a respective one of the gear box bolt holes and the corresponding flange bolt hole to fasten the ring gear to the gear box case.

In one example, the plurality of flanges includes a first set of flanges arranged along an upper side of the ring gear and a second set of flanges arranged along a lower side of the ring gear, where the upper side and lower side are on opposite sides of the plurality of gear teeth. In this example, the plurality of gear box bolt holes include a first set of bolt holes corresponding to the flange bolt holes of the first set of flanges and a second set of bolt holes corresponding to the flange bolt holes of the second set of flanges. In another example, the plurality of flanges include a single set of flanges arranged along a single side of the ring gear, and the plurality of gear box bolt holes include a single set of bolt holes corresponding to the flange bolt holes of the single set of flanges.

Each of the flanges may extend away from the gear teeth in a direction parallel to the ring gear axis. Alternatively, each of the plurality of flanges may extend away from the gear teeth in a direction that is angled relative to the ring gear axis. The plurality of flanges may include two sets of flanges arranged on opposite sides of the gear teeth, such that the two sets of flanges form a fishtail pattern.

A first outer radius of a first portion of the ring gear corresponding to the gear teeth may be smaller than a second outer radius of the ring gear of a second portion of the ring gear corresponding to the flanges, such that the first portion of the ring gear is separated from the gear box case by a gap.

Each of the plurality of flanges may include a first portion extending away from a portion of the ring gear including the gear teeth and a second portion situated further from the portion of the ring gear including the gear teeth relative to the first portion, the second portion having the flange bolt hole. The first portion may have a first width that is thinner than a second width of the second portion, and the thinner first width enables the ring gear to flex during operation of a transmission system that includes the ring gear.

Each of the plurality of flange bolt holes may be threaded, and each of the plurality of bolts is inserted through the respective gear box bolt hole and screwed into the respective flange bolt hole to secure the bolt. The ring gear assembly may further include a plurality of gaskets, each gasket positioned between a head of one of the plurality of bolts and a respective one of the plurality of gear box bolt holes to seal the gear box bolt hole. On an outer surface of the gear box case, each of the plurality of gear box bolt holes may be surrounded by a respective flattened bolt surface.

Another embodiment is a transmission system for powering at least one aircraft rotor. The transmission system includes a ring gear, a gear box case, and a plurality of bolts. The ring gear includes a plurality of gear teeth in an inside of the ring gear; the gear teeth are arranged in a circle around a ring gear axis. The ring gear also includes a plurality of flanges arranged along at least one side of the ring gear, each flange having a respective flange bolt hole therethrough, and each flange bolt hole having a respective bolt axis that is perpendicular to the ring gear axis. The gear box case includes a plurality of gear box bolt holes therethrough, each of the gear box bolt holes corresponding to a respective one of the flange bolt holes. Each of the plurality of bolts passes through a respective one of the gear box bolt holes and the corresponding flange bolt hole to fasten the ring gear to the gear box case.

Each of the plurality of flanges may extend away from the gear teeth in a direction parallel to the ring gear axis. A first outer radius of a first portion of the ring gear corresponding to the gear teeth may be smaller than a second outer radius of the ring gear of a second portion of the ring gear corresponding to the flanges, such that the first portion of the ring gear is separated from the gear box case by a gap.

Each of the flanges may include a first portion extending away from a portion of the ring gear including the gear teeth, the first portion having a first width, and a second portion situated further from the portion of the ring gear including the gear teeth relative to the first portion, the second portion having the flange bolt hole, the second portion having a second width, where the first width is thinner than the second width, the thinner first width enabling the ring gear to flex during operation of the transmission system.

The plurality of flanges may include a first set of flanges arranged along an upper side of the ring gear and a second set of flanges arranged along a lower side of the ring gear, where the upper side and lower side are on opposite sides of the plurality of gear teeth. In this example, the plurality of gear box bolt holes include a first set of bolt holes corresponding to the flange bolt holes of the first set of flanges and a second set of bolt holes corresponding to the flange bolt holes of the second set of flanges. Each of the plurality of flanges may extend away from the gear teeth in a direction that is angled relative to the ring gear axis such that the two sets of flanges form a fishtail pattern.

Yet another embodiment is a ring gear that includes a plurality of gear teeth and a plurality of flanges. The plurality of gear teeth are in an inside of the ring gear, the gear teeth arranged in a circle around a ring gear axis. The plurality of flanges are arranged along at least one side of the ring gear, each flange having a respective flange bolt hole therethrough, each flange bolt hole having a respective bolt axis perpendicular to the ring gear axis, at least a portion of the bolt hole axes intersecting the ring gear axis.

The plurality of flanges may include a first set of flanges arranged along an upper side of the ring gear and a second set of flanges arranged along a lower side of the ring gear, where the upper side and lower side are on opposite sides of the plurality of gear teeth.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
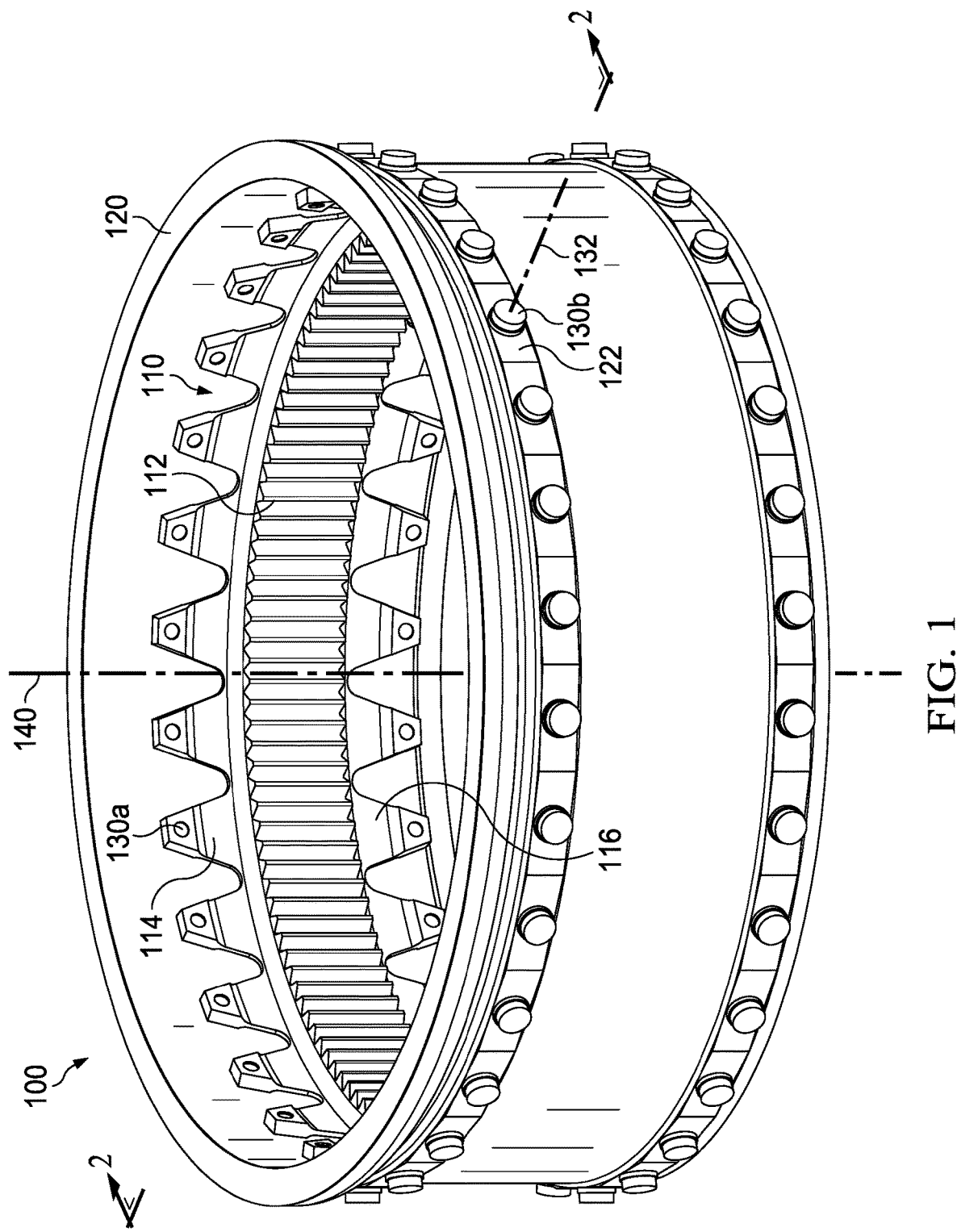
FIG. 1 illustrates a top isometric view of an example ring gear assembly in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, depth, etc.) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a ring gear assembly that includes a ring gear and a gear box case. Gear teeth are arranged in a circle around an interior of the ring gear, surrounding a ring gear axis that goes through the center of the ring gear. The ring gear includes flanges that extend upwards and/or downwards from the ring gear. A circle formed by the flanges has approximately the same diameter as the main body of the ring gear that includes the gear teeth. A bolt hole extends through each of the flanges in a direction perpendicular to the ring gear axis. Bolt hole axes extending through the flange bolt holes may intersect at the ring gear axis.

The gear box case has a set of bolt holes that correspond to the flange bolt holes. A set of bolts fasten the flanges of the ring gear to the gear box case. The flanges allow the ring gear to flex within the gear box during operation. The positioning of the bolts manages deflections and strain caused by operation of the gear system, and distributes the load around the gear box case.

The outer diameter of the connection between the ring gear to the gear box case is smaller than prior gear box arrangements, so that the ring gear assembly takes up less room in the overall system. This reduces weight and size of the gear system, which can provide more room for other components, or reduce the size of the overall system.

Alternatively, a designer can use the space gained to increase the diameter of the ring gear and the sizes of any of the planetary gears and/or sun gear in the gear system. Increasing the size of the gear system can increase the overall power and torque provided by the gear system. More generally, the ring gear assembly improves the ratio between the outer diameter of the gear box and the maximum power output by the gear box compared to prior ring gear and gear box case designs.

FIG. 1 illustrates a top isometric view of an example ring gear assembly 100. The ring gear assembly 100 includes a ring gear 110, a gear box case 120, and a set of bolts 130, including bolt 130a and bolt 130b. The bolts 130 fasten the ring gear 110 to the gear box case 120.

The ring gear 110 includes a set of gear teeth 112 arranged in a circle along the inside of the ring gear 110. A ring gear axis 140 is shown extending through the center of the ring gear 110 and through the center of the circle formed by the gear teeth 112. The ring gear 110 may be included in a planetary gear system. For example, the gear teeth 112 are sized and positioned to mesh with one or more planetary gears (not shown in FIG. 1) that fit inside the ring gear 110 and move around on the gear teeth 112. The teeth of the planetary gears may also mesh with a sun gear (not shown in FIG. 1) that is centered around the ring gear axis 140. The planetary gear system may include additional components found in planetary gear-based transmission systems, such as a carrier, bands, actuators, brakes, etc.

Figure 2:
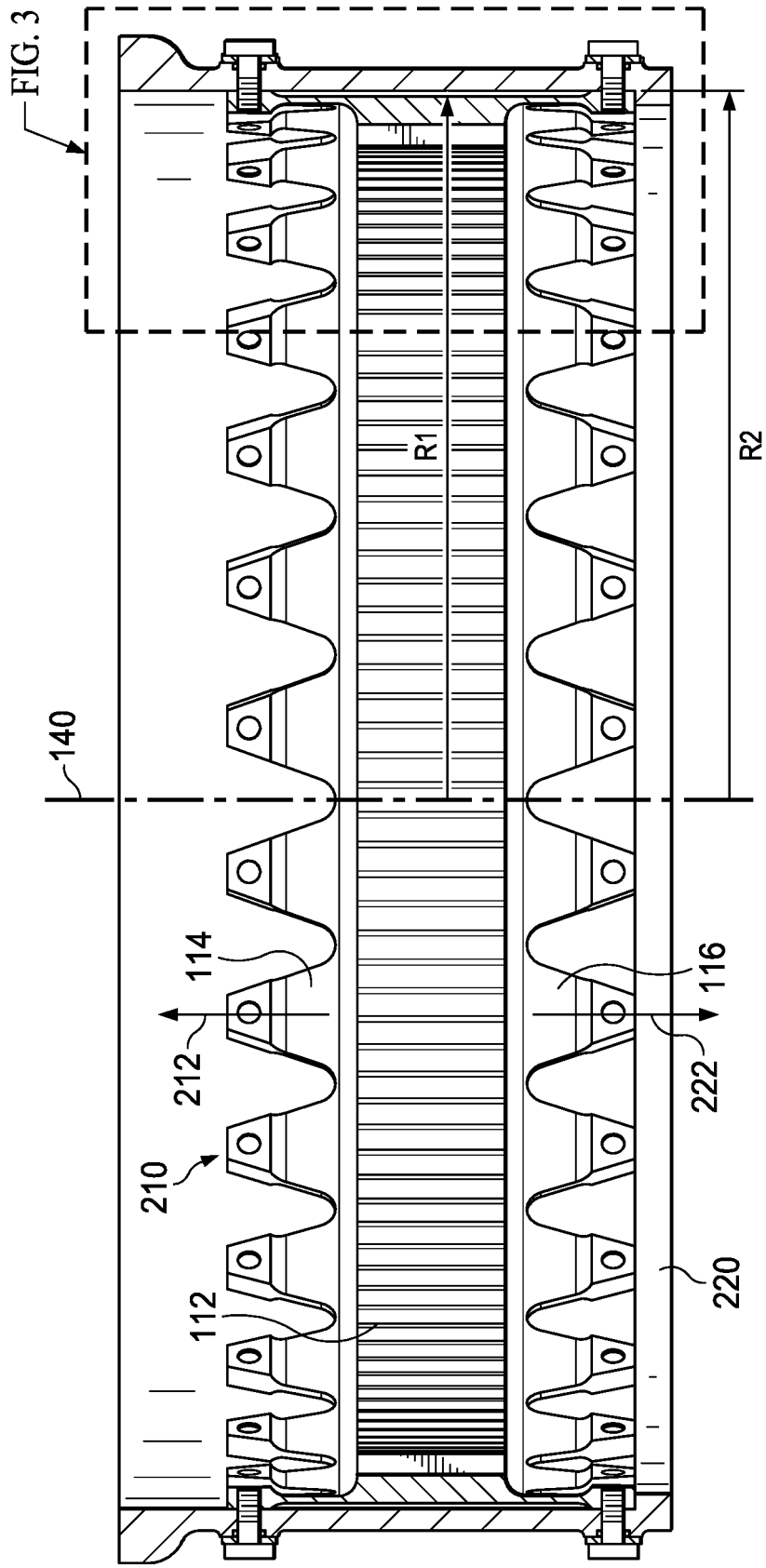
FIG. 2 illustrates a cross section view of the ring gear assembly shown in FIG. 1 in accordance with embodiments described herein.

The ring gear 110 shown in FIG. 1 includes two sets of flanges extending therefrom, one on each side of the ring gear 110. FIG. 2 illustrates a cross section view of the ring gear assembly 100 shown in FIG. 1. As shown in FIG. 2, the ring gear 110 has an upper side 210 and a lower side 220. The two sets of flanges are arranged on opposite sides of the ring gear 110, i.e., a first set is arranged around the upper side 210 and a second set is arranged around the lower side 220. One upper flange 114 and one lower flange 116 are labeled in FIGS. 1 and 2.

Figure 4:
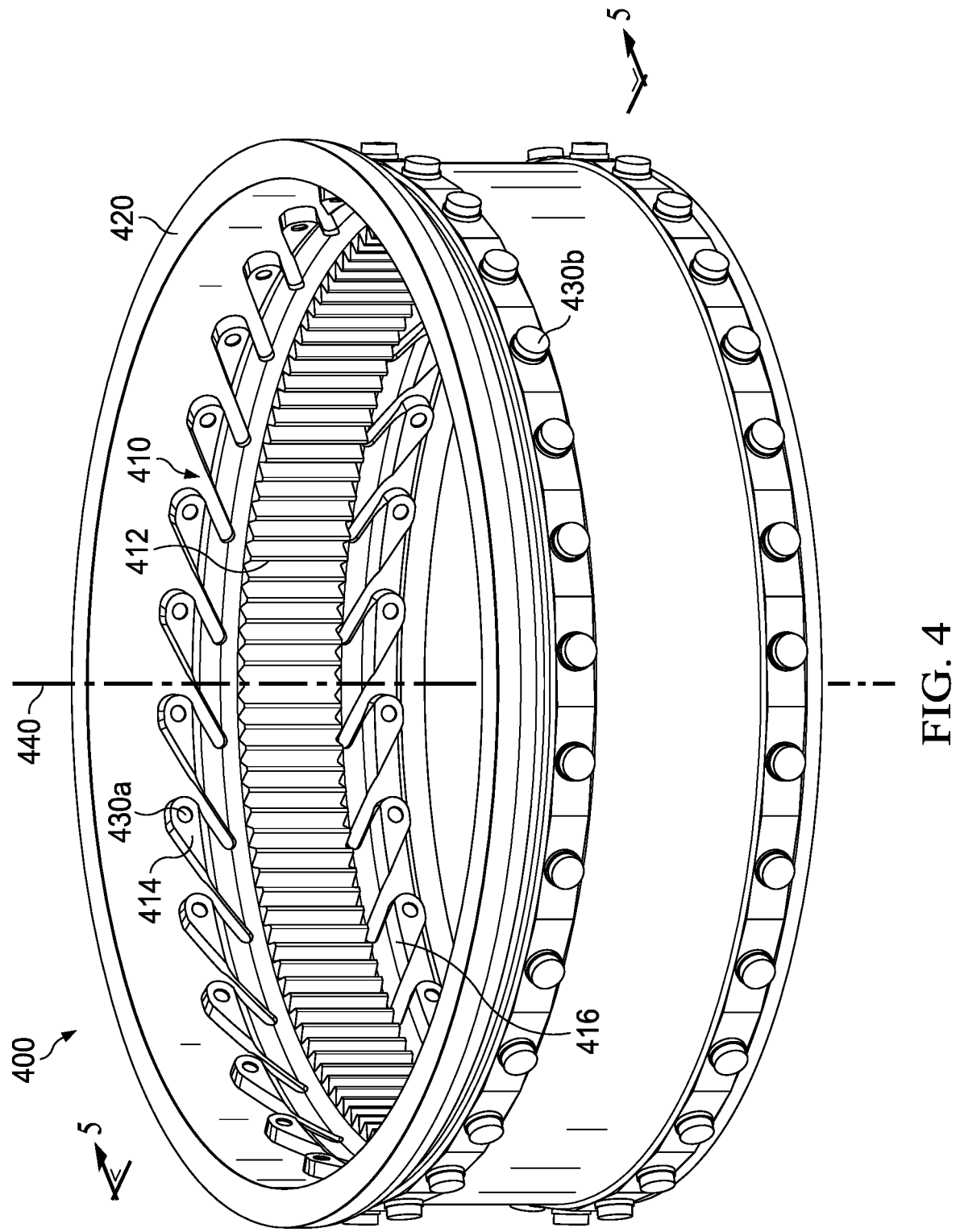
FIG. 4 illustrates a top isometric view of a second example ring gear assembly with a fishtail flange arrangement in accordance with embodiments described herein.
Figure 5:
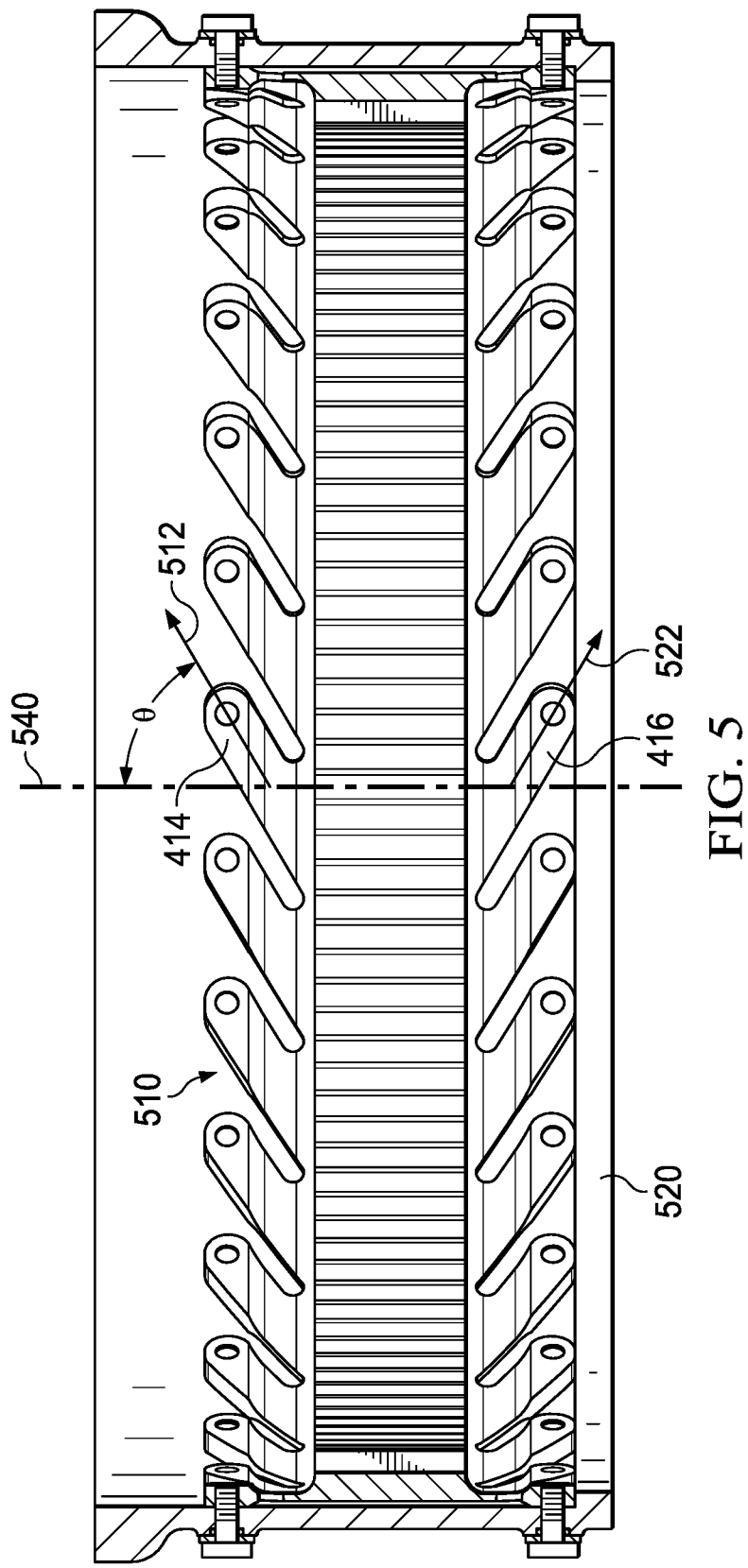
FIG. 5 illustrates a cross section view of the ring gear assembly shown in FIG. 4 in accordance with embodiments described herein.

Each of the flanges extends away from the gear teeth 112 in a direction parallel to the ring gear axis 140. In the view shown in FIG. 2, the flanges extend vertically above and below the gear teeth 112. A flange direction 212 of the upper flange 114 and a flange direction 222 of the lower flange 116 are shown. In other examples, the flanges may extend in a different direction, e.g., at an angle relative to the ring gear axis 140. One other example flange pattern is shown in FIGS. 4 and 5. Each of the flanges includes a bolt hole into which a bolt 130 is fastened. For example, as shown in FIG. 1, the upper flange 114 has a bolt hole into which a bolt 130a is fastened.

The gear box case 120 fits around the ring gear 110. The gear box case 120 houses the ring gear 110 and other components that fit within the ring gear 110. The gear box case 120 has a set of bolt holes therethrough; the bolt holes of the gear box case 120 correspond to the bolt holes of the flanges. As shown in FIG. 1, the gear box case 120 has two sets of bolt holes arranged in a circle around an upper portion and another circle around a lower portion of the gear box case 120, corresponding to the upper set of flanges and the lower set of flanges respectively. Bolts 130 are fitted through each of the gear box bolt holes and fastened to the ring gear 110 at the flange bolt holes.

As an example, bolt 130b extends through an upper gear box bolt hole and is fastened to an upper flange of the ring gear 110. A bolt axis 132 passes through the center of the bolt 130b and through the centers of the corresponding bolt holes through the flange and the gear box case 120. The bolt axis 132 is perpendicular to the ring gear axis 140. In some embodiments, the bolt axes extend axially from the ring gear axis 140, and each of the bolt axes for a set of flanges intersects at the ring gear axis 140. In the example shown in FIGS. 1 and 2, the bolt axes for the bolts around the upper side 210 of the ring gear intersect at a first point along the ring gear axis 140, and the bolt axes for the bolts around the lower side 220 of the ring gear intersect at a second, lower point along the ring gear axis 140.

In the example shown in FIG. 1, the gear box case 120 has flattened outer bolt surfaces surrounding the bolt holes. For example, the bolt hole around the bolt 130b is surrounded by a bolt surface 122 that is flat, while portions of the gear box case 120 above and below the bolt surface 122 are cylindrical. Flattening the bolt surfaces 122 provides a flat surface for washers and the bolt heads of the bolts 130 to sit on.

Two radiuses of the ring gear 110, R1 and R2, are shown in FIG. 2. R1 is a radius to the outer edge of a portion of the ring gear 110 corresponding to the gear teeth 112. R2 is a radius to the outer edge of a portion of the ring gear 110 corresponding to the lower flanges. The ring gear 110 may have the same radius R2 at the upper flanges. As shown in FIG. 2, R2 is slightly larger than R1, i.e., the radius of the ring gear 110 along the flanges is slightly larger than the radius of the ring gear 110 along the gear teeth 112. If the inner radius of the gear box case 120 is constant along the portion of the gear box case 120 where the ring gear 110 is fitted, and the flanges are flush against the gear box case 120, there is a gap between the gear box case 120 and the portion of the ring gear 110 corresponding to the gear teeth 112.

Figure 3:
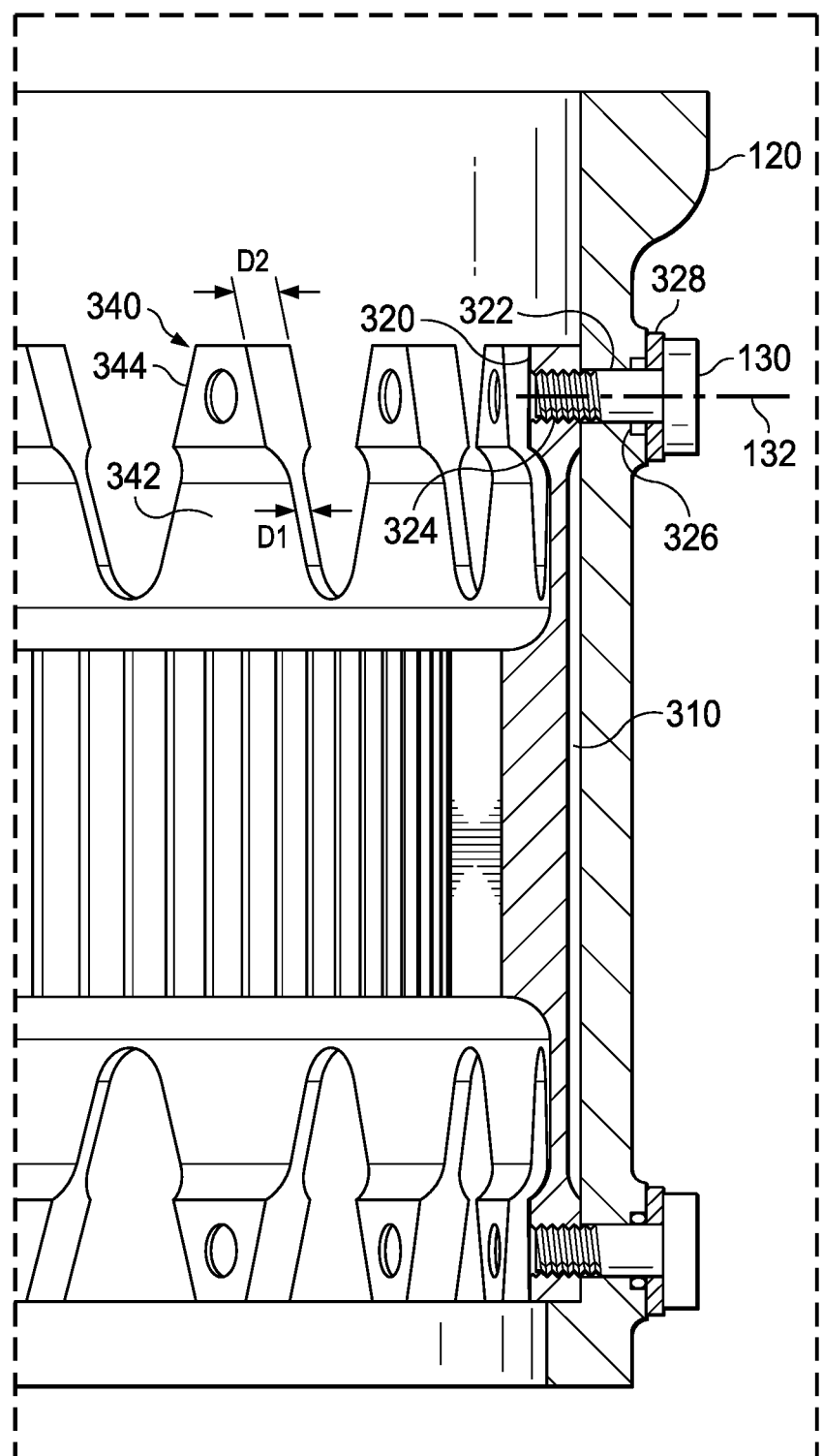
FIG. 3 is a close-up view of a portion of the cross section of the ring gear assembly shown in FIG. 2 in accordance with embodiments described herein.

FIG. 3 shows a close-up view of a portion of the cross section of the ring gear assembly shown in FIG. 2, including the gap 310 between the ring gear 110 and the gear box case 120. The gap 310 allows the ring gear 110 to flex into the gap during operation. In other examples, the inner radius of the gear box case 120 may vary, with a larger inner radius along a portion of the gear box case 120 corresponding to the gear teeth 112, and a smaller inner radius along a portion of the gear box case 120 having the gear box bolt holes and fitting against the flanges of the ring gear 110.

FIG. 3 also shows a detailed cross-section of one of the bolts 130 extending through the gear box case 120 and a flange 320 of the ring gear 110. The bolt 130 passes through a gear box bolt hole 322 and a flange bolt hole 324 to fasten the gear box case 120 to the flange 320. In the example shown in FIG. 3, the flange bolt hole 324 is threaded, and the gear box bolt hole 322 is not threaded. The bolt 130 is threaded at least in the portion that screws into the threading of the flange bolt hole 324; the portion of the bolt 130 passing through the gear box bolt hole 322 may be smooth.

A gasket 326 and washer 328 are positioned between the head of the bolt 130 and the gear box bolt hole 322. The gasket 326 forms a seal at the gear box bolt hole 322 to prevent oil from inside the gear assembly from escaping the gear box case 120. The gasket 326 may be an O-ring or another shape of gasket.

In the example shown in FIGS. 1-3, each of the flanges has two portions of different depths. As shown on upper flange 340 of FIG. 3, the flange 340 has a flex portion 342 that extends away from the portion of the ring gear 110 having the gear teeth 112. The flex portion 342 on the upper flange 340 extends upwards from the gear teeth 112; a corresponding lower flange has a flex portion that extends downwards from the gear teeth. The flange 340 also has a bolt connection portion 344 that is situated further away from the gear teeth 112 relative to the flex portion 342. The bolt connection portion 344 extends upwards from the flex portion 342; a corresponding lower flange has a bolt connection portion that extends downwards from its respective flex portion. The flex portion 342 has a depth D1 that is thinner than a depth D2 of the bolt connection portion 344. As shown in FIG. 3, there is a transition region between the bolt connection portion 344 and the flex portion 342 in which the depth gradually transitions from D2 to D1.

The bolt connection portion 344 includes the flange bolt hole to which the bolt is fastened. The larger depth D2 of the bolt connection portion 344 provides a secure connection between the bolt and the flange, and thus between the ring gear 110 and the gear box case 120. The smaller depth D1 of the flex portion 342 allows the ring gear 110 and, in particular, the flanges, to flex during operation of the transmission system.

FIG. 4 illustrates a top isometric view of a second example ring gear assembly 400 with a fishtail flange arrangement. The ring gear assembly 400 includes a ring gear 410, a gear box case 420, and a set of bolts 430, including bolt 430a and bolt 430b. The bolts 430 fasten the ring gear 410 to the gear box case 420.

The gear box case 420 and bolts 430 are similar to the gear box case 120 and bolts 130 described with respect to FIGS. 1-3. The ring gear 410 includes a set of gear teeth 412 which are similar to the gear teeth 112 described with respect to FIGS. 1-3, and may be used in a planetary gear system, as described above. A ring gear axis 440 is shown extending through the center of the ring gear 410 and the center of the gear box case 420.

The ring gear 410 shown in FIG. 4 includes two sets of flanges extending therefrom, one on each side of the ring gear 410. FIG. 5 illustrates a cross section view of the ring gear assembly 400 shown in FIG. 4. As shown in FIG. 5, the ring gear 410 has an upper side 510 and a lower side 520. The two sets of flanges are arranged on opposite sides of the ring gear 410, i.e., a first set is arranged around the upper side 510 and a second set is arranged around the lower side 520. One upper flange 414 and one lower flange 416 are labeled in FIGS. 4 and 5.

Each of the flanges extends away from the gear teeth 412 in a flange direction that is angled relative to the ring gear axis 440. In the view shown in FIG. 5, the flanges extend above and below the gear teeth 412. Like the flanges shown in FIGS. 1-3, each of the flanges shown in FIGS. 4 and 5 includes a bolt hole into which a bolt 430 is fastened. For example, as shown in FIG. 4, the upper flange 514 has a bolt hole into which a bolt 430a is fastened. The gear box case 420 has corresponding upper and lower bolt holes used to fasten the gear box case 420 to the ring gear 410. The geometry of the bolts and bolt holes are similar to that described with respect to FIGS. 1-3.

FIG. 5 further shows a flange direction 512 of the upper flange 414 and flange direction 522 of the lower flange 416. Each of the flanges extends upwards or downwards from the gear teeth 412, in a direction 512 or 522 at an angle $\theta$ relative to the ring gear axis 440. The flange angle $\theta$ has a value greater than 0° and less than 90°. For example, $\theta$ may be between 30° and 60°. Other flange angles may be used. Setting the flanges at an angle increases the length of the flanges without increasing the total height of the ring gear 410. This increases the amount that the ring gear 410 can flex without increasing the size of the ring gear 410 or the gear box case 420.

In the example shown in FIGS. 4 and 5, the angled upper and lower flanges form a fishtail pattern, e.g., both sets of flanges are facing the same direction. In another embodiment, the upper and lower flanges are facing opposite directions. In other embodiments, the upper and lower flanges face the same direction but have different flange angles.

Figure 6:
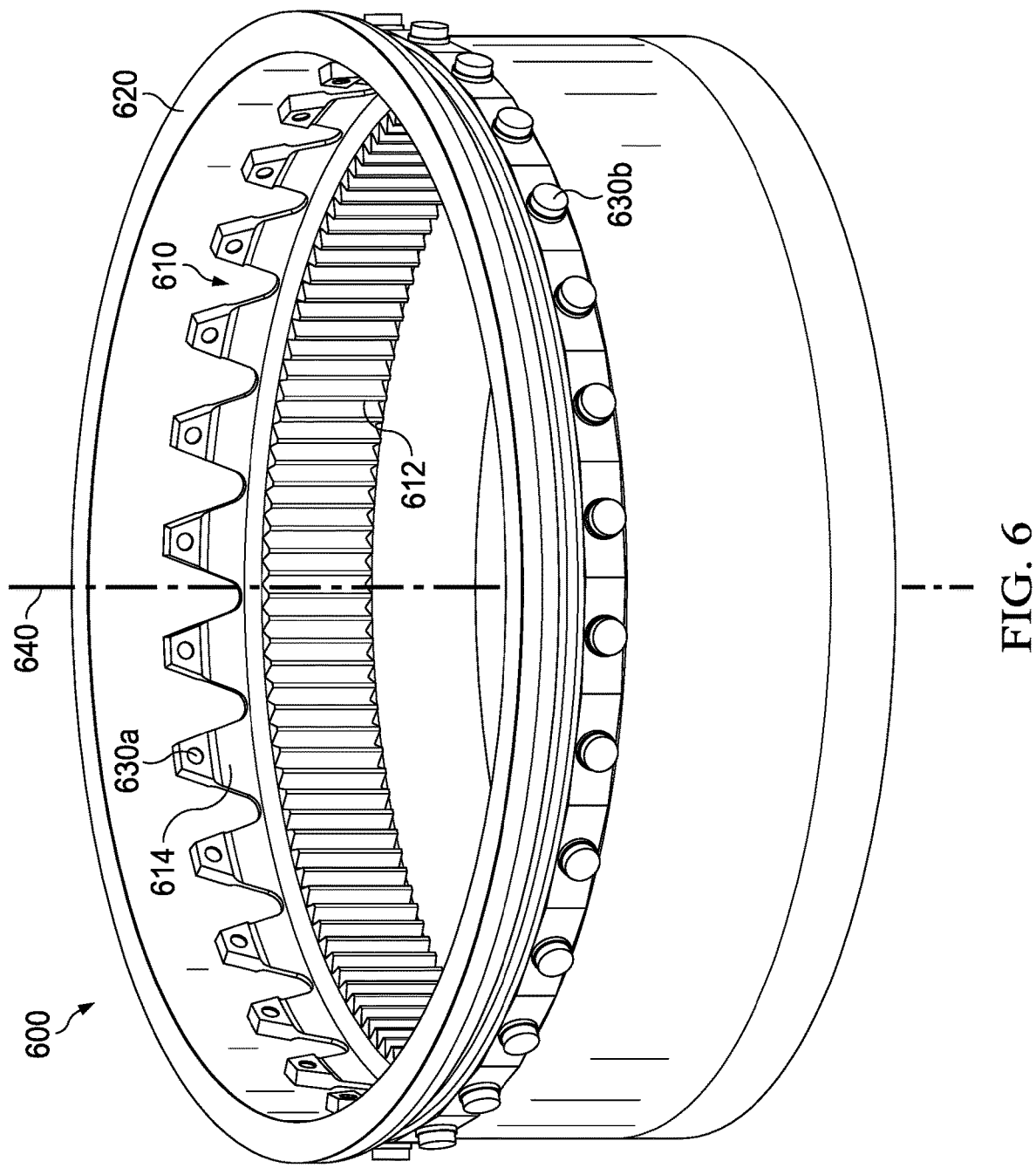
FIG. 6 illustrates a top isometric view of a third example ring gear assembly with one set of flanges in accordance with embodiments described herein.

FIG. 6 illustrates a top isometric view of a third example ring gear assembly 600 with one set of flanges. The ring gear assembly 600 includes a ring gear 610, a gear box case 620, and a set of bolts 630, including bolt 630a and bolt 630b. The ring gear assembly 600 is similar to the ring gear assembly 100 described with respect to FIG. 1, except the lower set of flanges and lower set of bolts are omitted. Instead, the ring gear 610 has a single set of flanges on one of its sides (here, the upper side), including upper flange 614, and the gear box case 620 has a single set of corresponding single set of gear box holes that align with the flange bolt holes of the ring gear 610. The orientation of the ring gear assembly 600 is merely exemplary; e.g., the ring gear assembly 600 may be flipped so that there is a single set of flanges on its lower side.

Fastening the ring gear 610 to the gear box case 620 along a single side may increase the amount that the ring gear 610 can flex during operation. Furthermore, removing one set of flanges and one set of bolts relative to the designs shown in FIGS. 1-5 reduces the weight and complexity of the ring gear assembly 600, and may reduce the height of the ring gear assembly 600 in the direction of the ring gear axis 640. However, the ring gear assembly 600 may be less secure than the assemblies 100 and 400 shown in FIGS. 1-5 since one side of the ring gear 610 is not connected to the gear box case 620 and fewer total connection points (i.e., fewer bolts) are included. Furthermore, including two sets of flanges, as shown in FIGS. 1-5, prevents tilting of the ring gear when the ring gear is flexed. In addition, including two sets of flanges may better manages deflections and strain during operation of the gear system, and further distributes the load around the gear box case.

The shape and arrangement of the ring gear assemblies shown in FIGS. 1-6 are merely exemplary. For example, in other embodiments, the flanges may have different shapes or arrangements. While the flanges shown in FIGS. 1-3 and 6 are shown tapering in width as they extend from the gear teeth toward the bolt holes, other shapes may be used, e.g., the flanges may taper in the flex portions and become wider at the bolt connection portion, or the flanges may have a more consistent width, as shown in FIGS. 4 and 5. Furthermore, while the examples shown in FIGS. 1-6 show flanges that each have one flange bolt hole, in other examples, a single flange may include two or more bolt holes. As another option, while each set of upper and lower flanges in FIGS. 1-6 flanges have bolt holes arranged in a circle, at the same height along the ring gear axis 140, in other embodiments, different flanges may have bolt holes at different heights along the ring gear axis 140, and/or the flanges may have different heights. As yet another example, fewer or more flanges and fewer or more corresponding bolts may be used than shown in FIGS. 1-6. Furthermore, while the flanges shown as being evenly spaced around the ring gear assemblies, in other embodiments, the flanges may not be evenly spaced, e.g., groups of two or more flanges may be separated from other groups by a larger gap, or other patterns may be used.

The components of the ring gear assembly may comprise any materials suitable for use with a transmission. For example, the ring gears 110, 410, and 610 may comprise a steel material, such as a carbon steel that may be carburized or nitrided; a bronze alloy; a plastic; or another type of material or combination of materials. The gear box cases 120, 420, and 620 may comprise aluminum, titanium, magnesium, or other materials. The materials selected for the ring gears and gear box case may be chosen based on the application of the ring gear assembly, e.g., different materials may be selected based on weight constraints, size constraints, cost, or other factors.

It should be appreciated that the ring gear assembly described herein can be used in various applications of ring gear systems. Indeed, the various embodiments of the ring gear assembly described herein may be used on any aircraft that utilizes rotors or other planetary systems, such as helicopters, tiltrotor aircraft, hybrid aircraft, dual tiltrotor aircraft, unmanned aircraft, gyrocopters, airplanes, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. In addition, the various embodiments of the ring gear assembly described herein may be used on other vehicles that utilize rotors, including automobiles, trucks, tractors, and construction equipment. Further uses of the ring gear assembly described herein may include turbine engines, automated manufacturing and assembly, printing, and other industrial applications.

Figure 7:
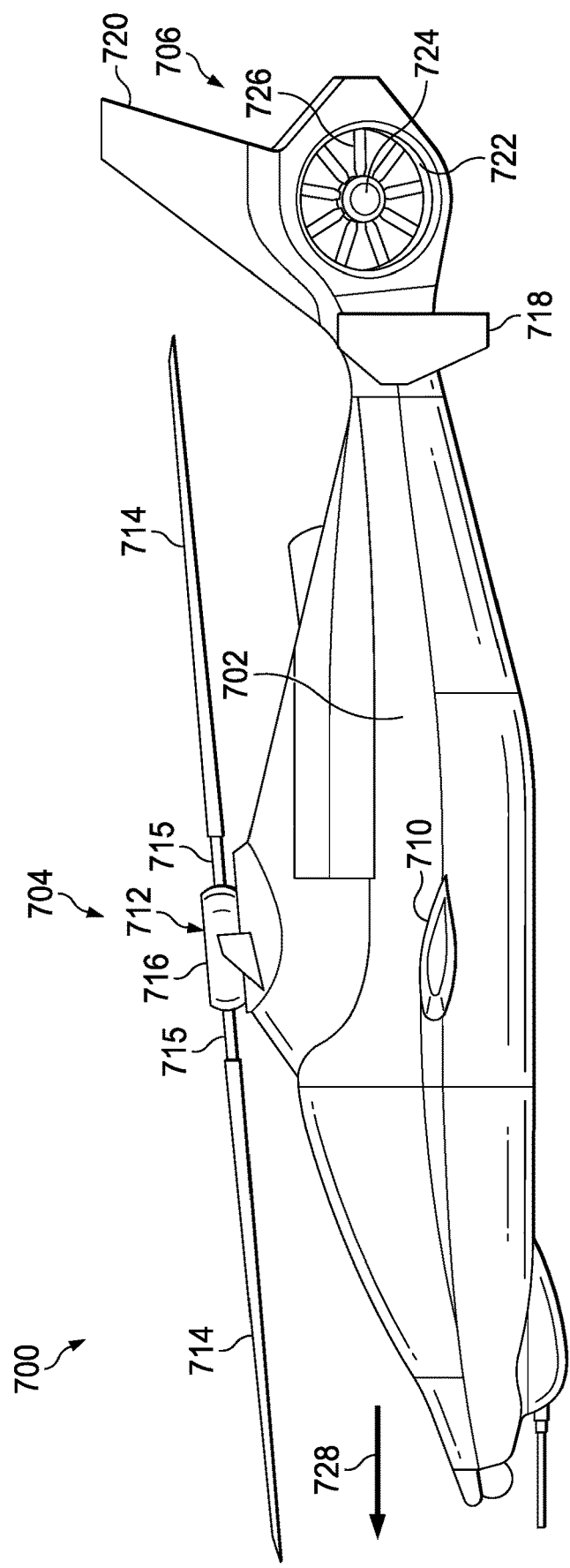
FIG. 7 illustrates a side view of an example aircraft in which a ring gear assembly in accordance with certain embodiments of the present disclosure may be implemented.
Figure 8:
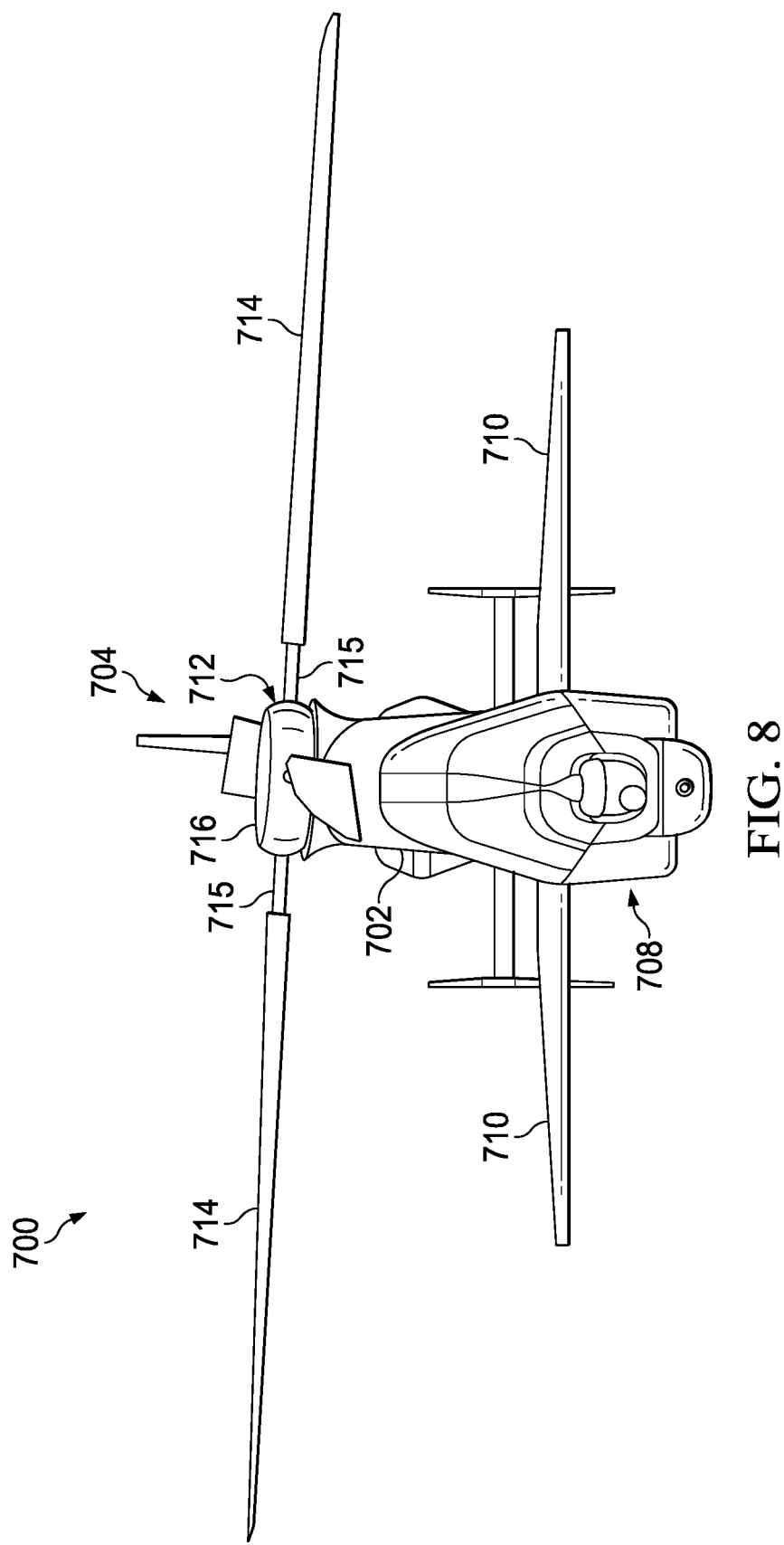
FIG. 8 illustrates a front plan view of the aircraft shown in FIG. 7.

FIGS. 7 and 8 illustrate one example rotorcraft in which the ring gear assembly described herein may be used. FIG. 7 illustrates a side view of the example rotorcraft 700, and FIG. 8 illustrates a front plan view of the rotorcraft 700. As shown in FIGS. 7 and 8, rotorcraft 700 includes a fuselage 702, a primary rotor system 704, and an empennage 706. The fuselage 702 is the main body of the rotorcraft 700, which may include a cabin (e.g., for crew, passengers, and/or cargo) and/or may house certain mechanical components, electrical components, etc. (e.g., engine(s), transmission, flight controls, etc.). In particular, the fuselage 702 may house a transmission that includes a ring gear assembly as described above.

The rotor system 704 is used to generate lift for rotorcraft 700. For example, the rotor system 704 (also generally referred to as the "rotor") may include a rotor hub 712 (also referred to as a "rotor hub assembly" or more generally as a "hub") coupled to a plurality of rotor blades 714 (also referred to generally as "blades") that extend radially from the rotor hub 712 via blade extensions 715. Torque generated by the engine(s) of the rotorcraft causes the rotor blades 714 to rotate, which generates lift. In particular, a rotorcraft engine may drive a transmission system that includes one of the ring gears described above, and the transmission system drives the rotor system 704. In accordance with features of embodiments disclosed herein, the rotor hub 712 is completely shrouded by a rotor hub fairing 716.

The empennage 706 of the rotorcraft 700 includes a horizontal stabilizer 718, a vertical stabilizer 720, and a tail rotor or anti-torque system 722. Although not shown in the view illustrated in FIG. 7, a corresponding horizontal stabilizer is disposed on the other side of the rotorcraft 700 opposite the horizontal stabilizer 718. The horizontal stabilizer 718 and vertical stabilizer 720 respectively provide horizontal and vertical stability for the rotorcraft 700. Moreover, tail rotor or anti-torque system 722 may be used to provide anti-torque and/or direction control for the rotorcraft 700. The tail rotor in the example shown in FIG. 7 is a ducted tail rotor that includes a hub 724 and blades 726 extending radially from the hub 724. The tai rotor 722 may be driven by a transmission system that includes a ring gear assembly as described above.

Rotorcraft 700 relies on rotor system 704 for flight capabilities, such as controlling (e.g., managing and/or adjusting) flight direction, thrust, and lift of the rotorcraft. For example, the pitch of each rotor blade 714 can be controlled using collective control or cyclic control to selectively control direction, thrust, and lift of the rotorcraft 700. During collective control, all of the rotor blades 714 are collectively pitched together (e.g., the pitch angle is the same for all blades), which affects overall thrust and lift. During cyclic control, the pitch angle of each of the rotor blades 714 varies depending on where each blade is within a cycle of rotation (e.g., at some points in the rotation the pitch angle is not the same for all blades), which can affect direction of travel of the rotorcraft 700.

Aircraft such as rotorcraft 700 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 700, the most aft blade (e.g., nearest to tail rotor or anti-torque system 722) of the rotor system 704 may be pitched more nose-up and the most forward blade may be pitched more nose-down; to provide a forward direction of travel (as generally indicated by arrow 728) for rotorcraft 700.

Example 1 is a ring gear assembly that includes a ring gear, a gear box case, and a plurality of bolt holes. The ring gear includes a plurality of gear teeth in an inside of the ring gear, the gear teeth arranged in a circle around a ring gear axis, and a plurality of flanges arranged along at least one side of the ring gear, each flange having a respective flange bolt hole therethrough, each flange bolt hole having a respective bolt axis perpendicular to the ring gear axis. The gear box case includes a plurality of gear box bolt holes therethrough, each of the gear box bolt holes corresponding to a respective one of the flange bolt holes. The plurality of bolts are each passing through a respective one of the gear box bolt holes and the corresponding flange bolt hole to fasten the ring gear to the gear box case.

Example 2 provides the ring gear assembly according to example 1, where the plurality of flanges includes a first set of flanges arranged along an upper side of the ring gear and a second set of flanges arranged along a lower side of the ring gear, where the upper side and lower side are on opposite sides of the plurality of gear teeth; and the plurality of gear box bolt holes includes a first set of bolt holes corresponding to the flange bolt holes of the first set of flanges, and a second set of bolt holes corresponding to the flange bolt holes of the second set of flanges.

Example 3 provides the ring gear assembly according to example 1, where the plurality of flanges are a single set of flanges arranged along a single side of the ring gear, and the plurality of gear box bolt holes are a single set of bolt holes corresponding to the flange bolt holes of the single set of flanges.

Example 4 provides the ring gear assembly according to any of the preceding examples, where each of the plurality of flanges extends away from the gear teeth in a direction parallel to the ring gear axis.

Example 5 provides the ring gear assembly according to any of examples 1 through 3, where each of the plurality of flanges extends away from the gear teeth in a direction that is angled relative to the ring gear axis.

Example 6 provides the ring gear assembly according to example 5, where the plurality of flanges include two sets of flanges arranged on opposite sides of the gear teeth, such that the two sets of flanges form a fishtail pattern.

Example 7 provides the ring gear assembly according to any of the preceding examples, where a first outer radius of a first portion of the ring gear corresponding to the gear teeth is smaller than a second outer radius of the ring gear of a second portion of the ring gear corresponding to the flanges, such that the first portion of the ring gear is separated from the gear box case by a gap.

Example 8 provides the ring gear assembly according to any of the preceding examples, where each of the plurality of flanges includes a first portion extending away from a portion of the ring gear including the gear teeth, and a second portion situated further from the portion of the ring gear including the gear teeth relative to the first portion, the second portion including the flange bolt hole.

Example 9 provides the ring gear assembly according to example 8, where the first portion has a first width that is thinner than a second width of the second portion, and the thinner first width enables the ring gear to flex during operation of a transmission system that includes the ring gear.

Example 10 provides the ring gear assembly according to any of the preceding examples, where each of the plurality of flange bolt holes are threaded, and each of the plurality of bolts is inserted through the respective gear box bolt hole and screwed into the respective flange bolt hole to secure the bolt.

Example 11 provides the ring gear assembly according to example 10, further including a plurality of gaskets, each gasket positioned between a head of one of the plurality of bolts and a respective one of the plurality of gear box bolt holes to seal the gear box bolt hole.

Example 12 provides the ring gear assembly according to example 10 or example 11, where, on an outer surface of the gear box case, each of the plurality of gear box bolt holes is surrounded by a respective flattened bolt surface.

Example 13 is a transmission system for powering at least one aircraft rotor, the transmission system including a ring gear, a gear box case, and a plurality of bolt holes. The ring gear includes a plurality of gear teeth in an inside of the ring gear, the gear teeth arranged in a circle around a ring gear axis, and a plurality of flanges arranged along at least one side of the ring gear, each flange having a respective flange bolt hole therethrough, each flange bolt hole having a respective bolt axis perpendicular to the ring gear axis. The gear box case includes a plurality of gear box bolt holes therethrough, each of the gear box bolt holes corresponding to a respective one of the flange bolt holes. The plurality of bolts are each passing through a respective one of the gear box bolt holes and the corresponding flange bolt hole to fasten the ring gear to the gear box case.

Example 14 provides the transmission system according to example 13, where the plurality of flanges includes a first set of flanges arranged along an upper side of the ring gear and a second set of flanges arranged along a lower side of the ring gear, where the upper side and lower side are on opposite sides of the plurality of gear teeth; and the plurality of gear box bolt holes includes a first set of bolt holes corresponding to the flange bolt holes of the first set of flanges, and a second set of bolt holes corresponding to the flange bolt holes of the second set of flanges.

Example 15 provides the transmission system according to example 14, where each of the plurality of flanges extends away from the gear teeth in a direction that is angled relative to the ring gear axis such that the two sets of flanges form a fishtail pattern.

Example 16 provides the transmission system according to example 13 or example 14, where each of the plurality of flanges extends away from the gear teeth in a direction parallel to the ring gear axis.

Example 17 provides the transmission system according to any of examples 13 through 16, where a first outer radius of a first portion of the ring gear corresponding to the gear teeth is smaller than a second outer radius of the ring gear of a second portion of the ring gear corresponding to the flanges, such that the first portion of the ring gear is separated from the gear box case by a gap.

Example 18 provides the transmission system according to any of examples 13 through 17, where each of the plurality of flanges includes a first portion extending away from a portion of the ring gear including the gear teeth, the first portion having a first width, and a second portion situated further from the portion of the ring gear including the gear teeth relative to the first portion, the second portion having the flange bolt hole, the second portion having a second width, where the first width is thinner than the second width, and the thinner first width enables the ring gear to flex during operation of the transmission system.

Example 19 provides a ring gear that includes a plurality of gear teeth in an inside of the ring gear, the gear teeth arranged in a circle around a ring gear axis; and a plurality of flanges arranged along at least one side of the ring gear, each flange having a respective flange bolt hole therethrough, each flange bolt hole having a respective bolt axis perpendicular to the ring gear axis, at least a portion of the bolt hole axes intersecting the ring gear axis.

Example 20 provides the ring gear according to example 19, where the plurality of flanges includes a first set of flanges arranged along an upper side of the ring gear, and a second set of flanges arranged along a lower side of the ring gear, where the upper side and lower side are on opposite sides of the plurality of gear teeth.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A ring gear assembly comprising:
  a ring gear comprising:
    a plurality of gear teeth in an inside of the ring gear, the gear teeth arranged in a circle around a ring gear axis;
    a first plurality of flanges arranged along a first side of the ring gear; and
    a second plurality of flanges arranged along a second side of the ring gear opposite the first side, wherein the first side and the second side are on opposite sides of the plurality of gear teeth, each flange of the first plurality of flanges and the second plurality of flanges having a respective flange bolt hole therethrough, each flange bolt hole having a respective bolt axis perpendicular to the ring gear axis;
  a gear box case comprising a plurality of gear box bolt holes therethrough, each of the gear box bolt holes corresponding to a respective one of the flange bolt holes; and
  a plurality of bolts each passing through a respective one of the gear box bolt holes and the corresponding flange bolt hole to fasten the ring gear to the gear box case.

2. The ring gear assembly of claim 1, wherein each of the first plurality of flanges extends away from the gear teeth in a direction parallel to the ring gear axis.

3. The ring gear assembly of claim 1, wherein each of the first plurality of flanges extends away from the gear teeth in a first direction that is angled relative to the ring gear axis, and each of the second plurality of flanges extends away from the gear teeth in a second direction that is angled relative to the ring gear axis.

4. The ring gear assembly of claim 3, wherein the first plurality of flanges and the second plurality of flanges are arranged in a fishtail pattern.

5. The ring gear assembly of claim 1, wherein a first outer radius of a first portion of the ring gear corresponding to the gear teeth is smaller than a second outer radius of the ring gear of a second portion of the ring gear corresponding to the first plurality of flanges, such that the first portion of the ring gear is separated from the gear box case by a gap.

6. The ring gear assembly of claim 1, wherein each of the first plurality of flanges comprises:
   a first portion extending away from a portion of the ring gear comprising the gear teeth; and
   a second portion situated further from the portion of the ring gear comprising the gear teeth relative to the first portion, the second portion comprising the flange bolt hole.

7. The ring gear assembly of claim 6, wherein the first portion has a first width that is thinner than a second width of the second portion, and the thinner first width enabling the ring gear to flex during operation of a transmission system comprising the ring gear.

8. The ring gear assembly of claim 1, wherein each of the flange bolt holes are threaded, and each of the plurality of bolts is inserted through the respective gear box bolt hole and screwed into the respective flange bolt hole to secure the bolt.

9. The ring gear assembly of claim 8, further comprising a plurality of gaskets, each gasket positioned between a head of one of the plurality of bolts and a respective one of the plurality of gear box bolt holes to seal the gear box bolt hole.

10. The ring gear assembly of claim 1, wherein, on an outer surface of the gear box case, each of the plurality of gear box bolt holes is surrounded by a respective flattened bolt surface.

11. A transmission system for powering at least one aircraft rotor, the transmission system comprising:
   a ring gear comprising:
      a plurality of gear teeth in an inside of the ring gear, the gear teeth arranged in a circle around a ring gear axis;
      a first plurality of flanges arranged along a first side of the ring gear; and
      a second plurality of flanges arranged along a second side of the ring gear opposite the first side, wherein the first side and the second side are on opposite sides of the plurality of gear teeth, each flange of the first plurality of flanges and the second plurality of flanges having a respective flange bolt hole therethrough, each flange bolt hole having a respective bolt axis perpendicular to the ring gear axis;
   a gear box case comprising a plurality of gear box bolt holes therethrough, each of the gear box bolt holes corresponding to a respective one of the flange bolt holes; and
   a plurality of bolts each passing through a respective one of the gear box bolt holes and the corresponding flange bolt hole to fasten the ring gear to the gear box case.

12. The transmission system of claim 11, wherein each of the first plurality of flanges extends away from the gear teeth in a direction parallel to the ring gear axis.

13. The transmission system of claim 11, wherein each of the first plurality of flanges extends away from the gear teeth in a first direction that is angled relative to the ring gear axis, and each of the second plurality of flanges extends away from the gear teeth in a second direction that is angled relative to the ring gear axis, such that the first plurality of flanges and the second plurality of flanges form a fishtail pattern.

14. The transmission system of claim 11, wherein a first outer radius of a first portion of the ring gear corresponding to the gear teeth is smaller than a second outer radius of the ring gear of a second portion of the ring gear corresponding to the first plurality of flanges, such that the first portion of the ring gear is separated from the gear box case by a gap.

15. The transmission system of claim 11, wherein each of the first plurality of flanges comprises:
   a first portion extending away from a portion of the ring gear comprising the gear teeth, the first portion having a first width; and
   a second portion situated further from the portion of the ring gear comprising the gear teeth relative to the first portion, the second portion comprising the flange bolt hole, the second portion having a second width;
   wherein the first width is thinner than the second width, the thinner first width enabling the ring gear to flex during operation of the transmission system.

16. A ring gear comprising:
   a plurality of gear teeth in an inside of the ring gear, the gear teeth arranged in a circle around a ring gear axis;
   a first plurality of flanges arranged along a first side of the ring gear; and
   a second plurality of flanges arranged along a second side of the ring gear opposite the first side, wherein the first side and the second side are on opposite sides of the plurality of gear teeth, each flange of the first plurality of flanges and the second plurality of flanges having a respective flange bolt hole therethrough, each flange bolt hole having a respective bolt axis perpendicular to the ring gear axis;
   wherein each of the first plurality of flanges comprises:
      a first portion extending away from a portion of the ring gear comprising the gear teeth, the first portion having a first width; and
      a second portion situated further from the portion of the ring gear comprising the gear teeth relative to the first portion, the second portion comprising the flange bolt hole, the second portion having a second width, wherein the first width is thinner than the second width.

17. The ring gear of claim 16, wherein each of the first plurality of flanges extends away from the gear teeth in a direction parallel to the ring gear axis.

18. The ring gear of claim 16, wherein each of the first plurality of flanges extends away from the gear teeth in a first direction that is angled relative to the ring gear axis, and each of the second plurality of flanges extends away from the gear teeth in a second direction that is angled relative to the ring gear axis.

19. The ring gear of claim 18, wherein the first plurality of flanges and the second plurality of flanges are arranged in a fishtail pattern.

20. The ring gear of claim 16, wherein the thinner first width of the first portion of each of the first plurality of flanges enables the ring gear to flex.

\* \* \* \* \*